(12) United States Patent
Rege et al.

(10) Patent No.: US 7,577,639 B2
(45) Date of Patent: Aug. 18, 2009

(54) METHOD FOR ANALYZING, DECONSTRUCTING, RECONSTRUCTING, AND REPURPOSING RHETORICAL CONTENT

(75) Inventors: Nabha V. Rege, Austin, TX (US); John Neil Cobb, Plano, TX (US); Yeow Loong Lee, Saint Louis, MO (US); Lee Alan Cobb, Dallas, TX (US); Kristen Jane Sebastian, Dallas, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 291 days.

(21) Appl. No.: 11/299,503

(22) Filed: Dec. 12, 2005

(65) Prior Publication Data

US 2007/0136233 A1    Jun. 14, 2007

(51) Int. Cl.
*G06F 17/30* (2006.01)
(52) U.S. Cl. ......................................................... 707/2
(58) Field of Classification Search .................... 707/1, 707/2, 3, 100, 102; 375/240.26; 709/224
See application file for complete search history.

(56) References Cited

U.S. PATENT DOCUMENTS

| | | | |
|---|---|---|---|
| 6,199,034 B1 | 3/2001 | Wical | |
| 6,353,824 B1 | 3/2002 | Boguraev et al. | |
| 6,374,271 B1 | 4/2002 | Shimizu et al. | |
| 6,513,063 B1 | 1/2003 | Julia et al. | |
| 6,523,061 B1 | 2/2003 | Halverson et al. | |
| 6,549,922 B1 | 4/2003 | Srivastava et al. | |
| 6,553,373 B2 | 4/2003 | Boguraev et al. | |
| 6,574,660 B1 | 6/2003 | Pashupathy et al. | |
| 6,636,831 B1 | 10/2003 | Profit, Jr. et al. | |
| 6,654,747 B1 | 11/2003 | Van Huben et al. | |
| 2002/0102524 A1 | 8/2002 | Rizzi | |
| 2003/0065533 A1 | 4/2003 | Scheinkman | |
| 2003/0126136 A1 | 7/2003 | Omoigui | |
| 2004/0008789 A1* | 1/2004 | Divakaran et al. | 375/240.26 |
| 2005/0033750 A1 | 2/2005 | Cobb et al. | |
| 2005/0138083 A1 | 6/2005 | Smith-Semedo et al. | |
| 2005/0149395 A1* | 7/2005 | Henkin et al. | 705/14 |
| 2005/0160107 A1* | 7/2005 | Liang | 707/100 |
| 2005/0165736 A1 | 7/2005 | Oosta | |
| 2006/0047682 A1* | 3/2006 | Black et al. | 707/102 |

* cited by examiner

*Primary Examiner*—Etienne P LeRoux
(74) *Attorney, Agent, or Firm*—Ed Guntin; Andrew Gust; Akerman Senterfitt (57) ABSTRACT

A system and method are disclosed for analyzing, deconstructing, reconstructing, and repurposing rhetorical content. A system that incorporates teachings of the present disclosure may include, for example, a content management system (400) having a database (404), and a controller (402) for managing the database. The controller can be programmed to retrieve (702) at least one of a first plurality of records, each including content, retrieve (706) rhetorical libraries, identify (714) patterns between the rhetorical libraries and the content of each record, and deconstruct (718) the content into one or more rhetorical topics according to the patterns identified. Additional embodiments are disclosed for analyzing, deconstructing, reconstructing, and repurposing content.

28 Claims, 9 Drawing Sheets

| Rhetorical Topic | Rhetorical Function |
| --- | --- |
| Classical Definition | Definition |
| Comparison Old/New | Comparison |
| Comparison Contrast by Quality | Comparison |
| Comparison Analogy | Comparison |
| Comparison Metaphor | Comparison |
| Comparison Simile | Comparison |
| Contrast by Improvement | Contrast |
| Contrast by Quantity | Contrast |
| Contrast Old/New | Contrast |
| Contrast Then/Now | Contrast |
| Contrast Attributes | Contrast |
| Application Differentiator | Differentiate |
| Attribute Differentiator | Differentiate |
| Benefit Differentiator | Differentiate |
| Capability Differentiator | Differentiate |
| Capacity Differentiator | Differentiate |
| Component Differentiator | Differentiate |
| Option Differentiator | Differentiate |
| Bundle Price Differentiator | Differentiate |
| Size Differentiator | Differentiate |
| Point Statement Issue Resolution | Point |
| Point Statement Amplifier | Point |
| Point Statement Convince | Point |
| Point Statement Comparison | Point |
| Point Statement Enthymeme | Point |
| Point Statement Result | Point |

METHOD FOR ANALYZING, DECONSTRUCTING, RECONSTRUCTING, AND REPURPOSING RHETORICAL CONTENT

RELATED APPLICATIONS

U.S. Patent Application, Publication No. US2005/0033750, filed Aug. 6, 2003, by Cobb et al., entitled "RHETORICAL CONTENT MANAGEMENT SYSTEM AND METHODS", whose contents are hereby incorporated by reference herein.

U.S. Patent Application, Publication No. US2005/0033754, filed Mar. 22, 2004, by Cobb et al., entitled "RHETORICAL CONTENT MANAGEMENT WITH TONE AND AUDIENCE PROFILES", whose contents are hereby incorporated by reference herein.

U.S. patent application Ser. No. 11/230,015, filed Sep. 19, 2005, by Allan et al., entitled "DATABASE STRUCTURE AND METHOD", whose contents are hereby incorporated by reference herein.

U.S. patent application Ser. No. 11/299,507, filed Dec. 12, 2005, by Cobb et al., entitled "METHOD FOR CONSTRUCTING AND REPURPOSING RHETORICAL CONTENT", whose contents are hereby incorporated by reference herein.

FIELD OF THE DISCLOSURE

The present disclosure relates generally to content management systems, and more specifically to a method for analyzing, deconstructing, reconstructing, and repurposing rhetorical content.

BACKGROUND

Documents and displayable media such as advertising materials contain "content." Different content has different purposes, different formats, and different subject matter. Content that has meaning and purpose is typically referred to as rhetorical content.

Most businesses strive to provide a consistent image for all media materials. Content management may be useful, for example, in providing a consistent product description in advertising materials across multiple sales and marketing mediums such as websites, proposals, brochures, and other documents.

Managing content can be a significant challenge for businesses, creating significant costs for large multi-department organizations. Content reuse issues are made more difficult by variances in regional product availability, audience type, and target marketing. Thus, reoccurring creation and delivery of high quality content to customers and clients is often inefficient and expensive.

As such, expenses increase as content is manually adapted or edited for various uses and formats. It can be difficult for business and organizations to efficiently create content that is consistent, accurate, and readily available for reuse. Especially when so much content already exists and is in a format not conducive to repurposing.

DETAILED DESCRIPTION

Embodiments in accordance with the present disclosure provide a method for analyzing, deconstructing, reconstructing, and repurposing rhetorical content.

In a first embodiment of the present disclosure, a computer-readable storage medium operates in a content management system. The storage medium can have computer instructions for retrieving at least one of a first plurality of records, each comprising content, identifying a purpose for the content of each record, associating at least one rhetorical topic library with the content of each record according to the content's purpose, parsing the content of each record into a combination of one or more rhetorical and structural elements according to the at least one rhetorical topic library associated with said content, and storing the rhetorical elements each with an identifiable functional attribute for association with a portion of the at least one rhetorical topic library.

In a second embodiment of the present disclosure, a content management system has a database, and a controller for managing the database. The controller can be programmed to retrieve at least one of a first plurality of records, each including content, retrieve rhetorical libraries, identify patterns between the rhetorical libraries and the content of each record, and deconstruct the content into one or more rhetorical topics according to the patterns identified.

In a third embodiment of the present disclosure, a method operates in a content management system for deconstructing multimedia content. The method can have the steps of retrieving from a first plurality of records one or more records each comprising multimedia content, identifying a purpose for the multimedia content of each record, identifying rhetorical and structural libraries associated with each purpose, identifying similarities between the rhetorical and structural libraries and the multimedia content in each record, parsing the multimedia content of each record into one or more rhetorical and structural elements according to the similarities identified, and storing the one or more rhetorical and structural elements of each record in a second plurality of records with functional attributes for association to the rhetorical and structural libraries.

Figure 1:
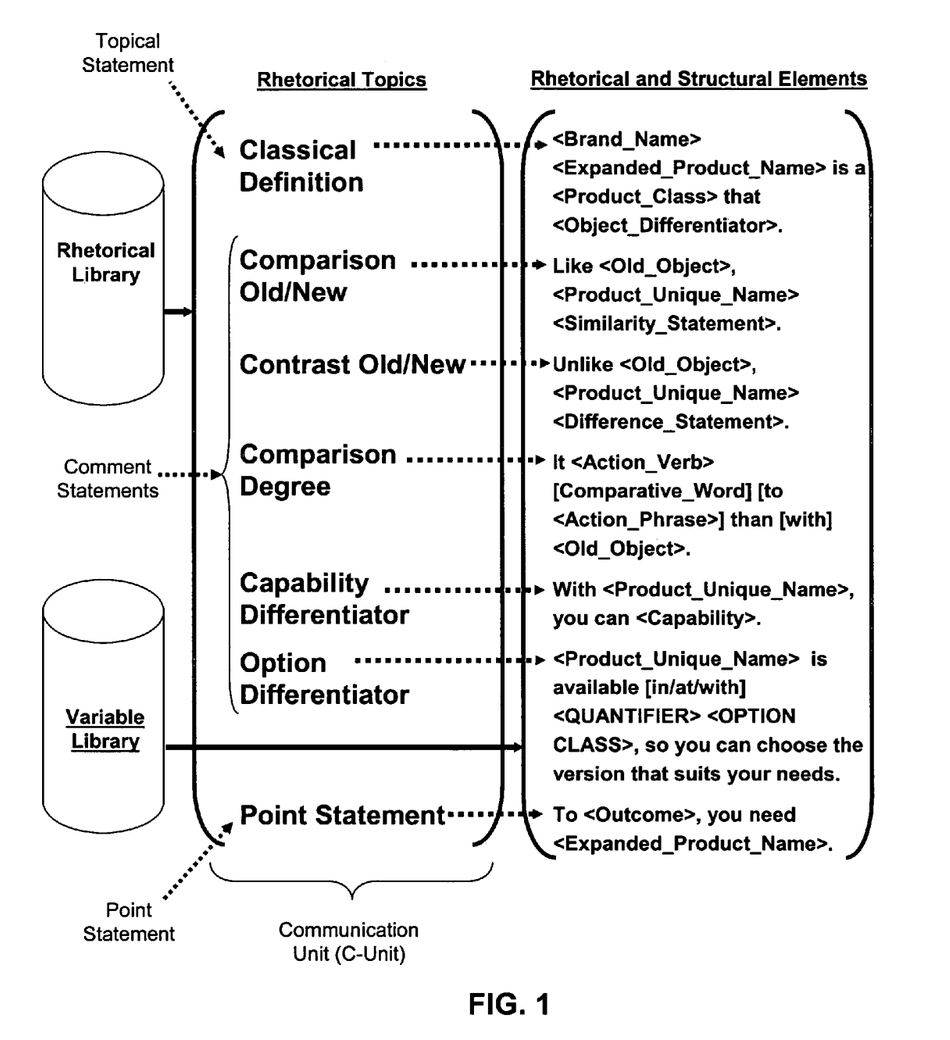
FIG. 1 depicts an exemplary embodiment of a rhetorical library with unpopulated variables of rhetorical topics.

FIG. 1 depicts an exemplary embodiment of a rhetorical library with unpopulated variables of rhetorical topics. The rhetorical topics shown by way of example in FIG. 1 include a classical definition, a comparison between old and new, a contrast between old and new, a comparison as a matter of degree, a capability differentiator, an option differentiator, and a point statement. Each of these rhetorical topics can be subdivided into variable building blocks referred to as rhetorical and structural elements.

Figure 2:
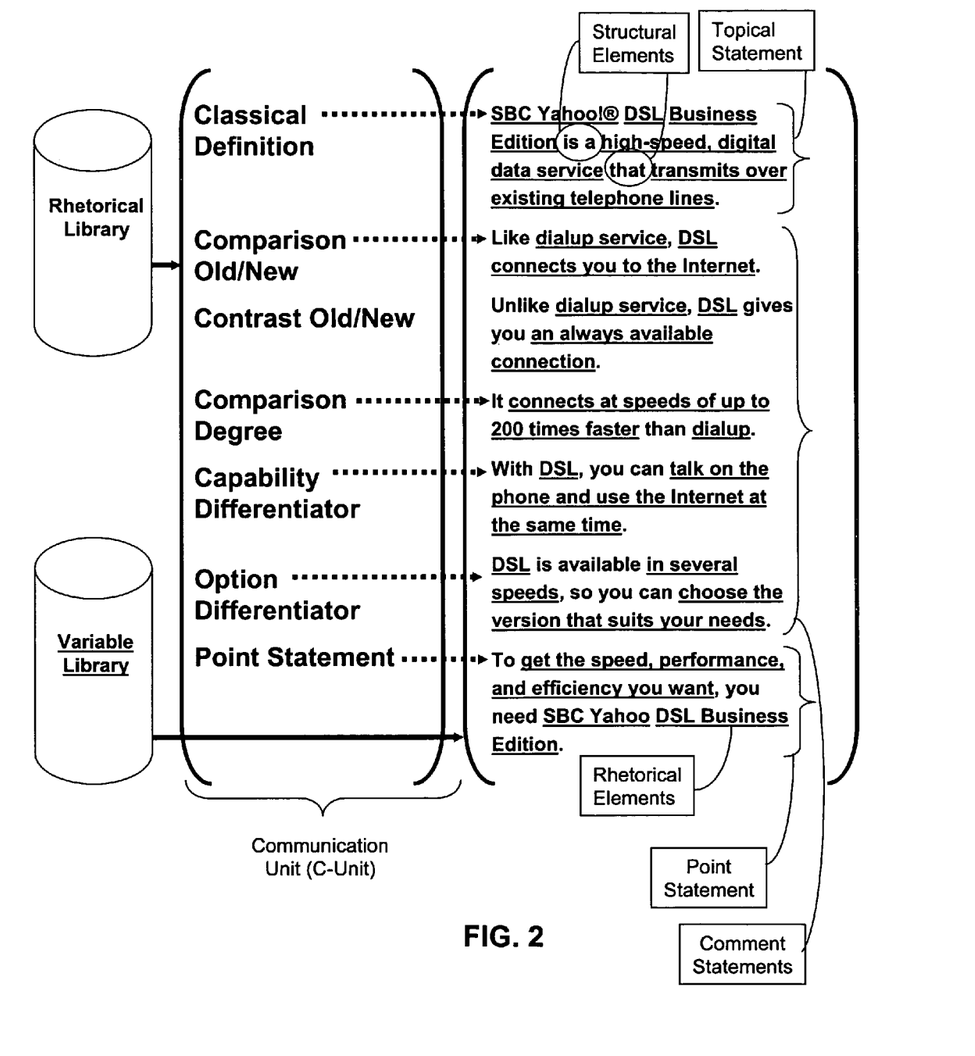
FIG. 2 depicts an exemplary embodiment for populating variables in the rhetorical library.

Rhetorical elements express ideas, while structural elements serve to combine ideas coherently to convey as clearly as possible a message to an audience. The rhetorical elements depicted with angle brackets are variables which can be dynamically populated to construct rhetorical topics of varying complexity and application. FIG. 2 illustrates how the rhetorical elements can be populated with rhetorical elements language to form repurposed rhetorical content. The rhetorical elements language consists of rhetorical content associated with the variables of each rhetorical topic. A variety of rhetorical elements language can be dynamically selected so as to repurpose content in a number of ways according to a chosen rhetorical purpose, knowledge of audience, and so on.

Structural elements referred to earlier conform to one or more rules for conveying a coherent expression. For example, written rhetoric as shown in FIGS. 1 and 2 utilizes structural elements governed by common rules of grammar associated with the language in question. Thus when rhetorical elements are combined with structural elements, a coherent expression can be formed such as shown in FIG. 2. It should be noted that although FIGS. 1 and 2 illustrate examples of English rhetoric, it would be apparent to one of ordinary skill in the art that any language is applicable to the present disclosure.

Once a set of rhetorical topics has been formed, a selection of the rhetorical topics such as shown in FIG. 2 can be used to form a communication unit (herein referred to as a "C-Unit"). A C-Unit is formed from a topic statement, one or more comment statements and a point statement. A simple C-Unit can roughly be equivalent to a paragraph. A complex C-Unit can be a combination of simple C-Units to create a larger functional entity within a document.

The topic statement (as is commonly referred to by writers of English) can be formed from a single rhetorical topic (such as the classical definition given in FIG. 2). The topic statement serves to convey to an audience a topic or theme. The comment statement(s) can be formed by one or more rhetorical topics. In the example of FIG. 2, the comment statements comprise the rhetorical topics of a comparison between old and new, a contrast between old and new, a comparison of degree, a capability differentiator, and an option differentiator. Comment statement(s) such as these can provide new information relating to the topic statement such as statements of fact or opinions. The point statement can be similarly formed by a rhetorical topic as shown in FIG. 2. The point statement can serve to convey an objective or purpose to be reached or achieved from a major idea or essential part of a concept or narrative.

A single C-Unit can represent any subset of languages such as a sentence, a paragraph, or a section of paragraphs. A C-Unit can serve to convey a simple message such as commonly found in advertisement clips. A combination of C-Units or complex C-Units, on the other hand, can form a schematic expression which can represent, for example, a complex document consisting of a multiplicity of sections (e.g., a marketing document, a legal agreement, a brochure, a product description, and so on). A C-Unit can be tailored to its audience on the basis of the variable library of rhetorical topics being populated with corresponding rhetorical content.

It should be noted that although FIGS. 1-2 depict written rhetoric, the present disclosure can be applied to audible rhetoric, tactile rhetoric, and other forms of visual rhetoric. Similar in principle to the rules of grammar, rules can be established for audible rhetoric, tactile rhetoric, and visual rhetoric. These rules can serve to combine audible or visual rhetorical elements with corresponding structured elements to convey coherent thoughts and/or messages to any number of audiences.

Audible rhetoric can be represented by, for example, synthesized audible rhetoric or human audible rhetoric. Synthesized audible rhetoric can be generated by common software technologies that synthesize speech to text or text to speech. Human audible rhetoric derives from spoken language by either gender expressed in any context (e.g., formal presentations, drama, musical expressions, oratory, narrative, etc.). Tactile rhetoric can be represented by Braille which can be translated to written rhetoric and vice-versa. Visual rhetoric, of which written rhetoric is a subset, can also represent still image rhetoric (e.g., a cover page, a poster, a picture, a drawing, a sketch, a cartoon, etc.) of animate or inanimate objects, and moving image rhetoric (e.g., 2-D animation, 3-D animation, a video clip, Flash video, etc.). Audible or visual rhetoric can be structured as rhetorical topics constructed from the building blocks of audible or visual rhetorical and structural elements.

Figure 3:
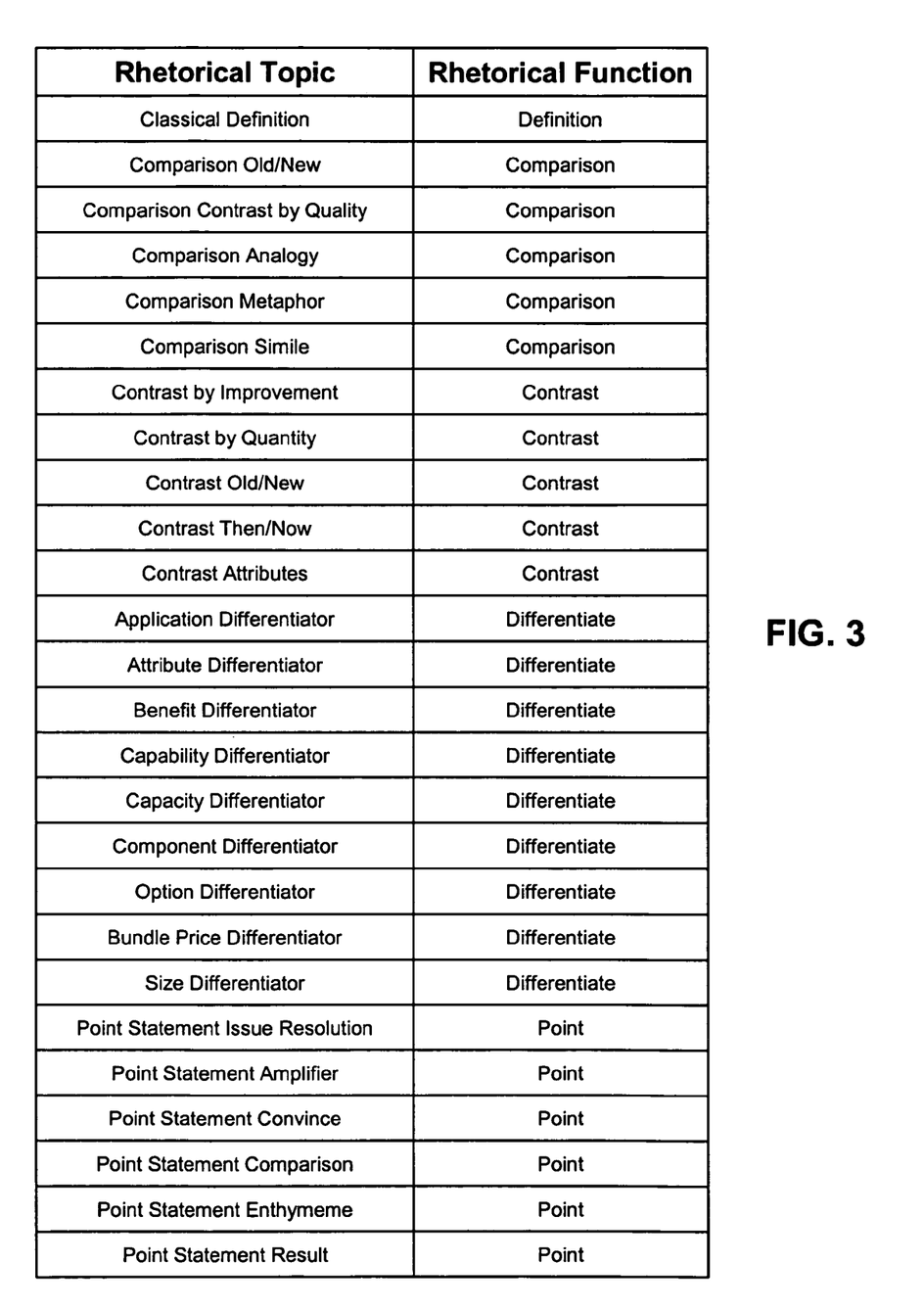
FIG. 3 depicts an exemplary supplemental embodiment of rhetorical topics.

FIGS. 1-2 provide a small sample of C-Unit structures based on rhetorical topics and their building blocks. It would be apparent to an artisan with ordinary skill in the art that innumerable rhetorical topics can be identified from an expansive spectrum of contextual matters. Moreover, rhetorical topics themselves can be refined and subdivided in order to expand the scope of C-Units that can be generated from a rhetorical topic variable library. With this flexibility, C-Units can be tailored to a type of audience (e.g., novice, experienced, expert, young, middle aged, old, male, female, etc.). The table in FIG. 3 illustrates how the rhetorical topics of FIGS. 1 and 2 can be further refined. As should be evident from this table, rhetorical topics can be refined as much as may be deemed necessary. Although not shown, for each rhetorical topic of FIG. 3 a framework of variable rhetorical and structural elements can be formed similar to what is shown in FIG. 1. For convenience, the rhetorical topic variable library (a sample of which is shown in FIG. 1) will be referred to herein as a rhetorical topic library.

Figure 4:
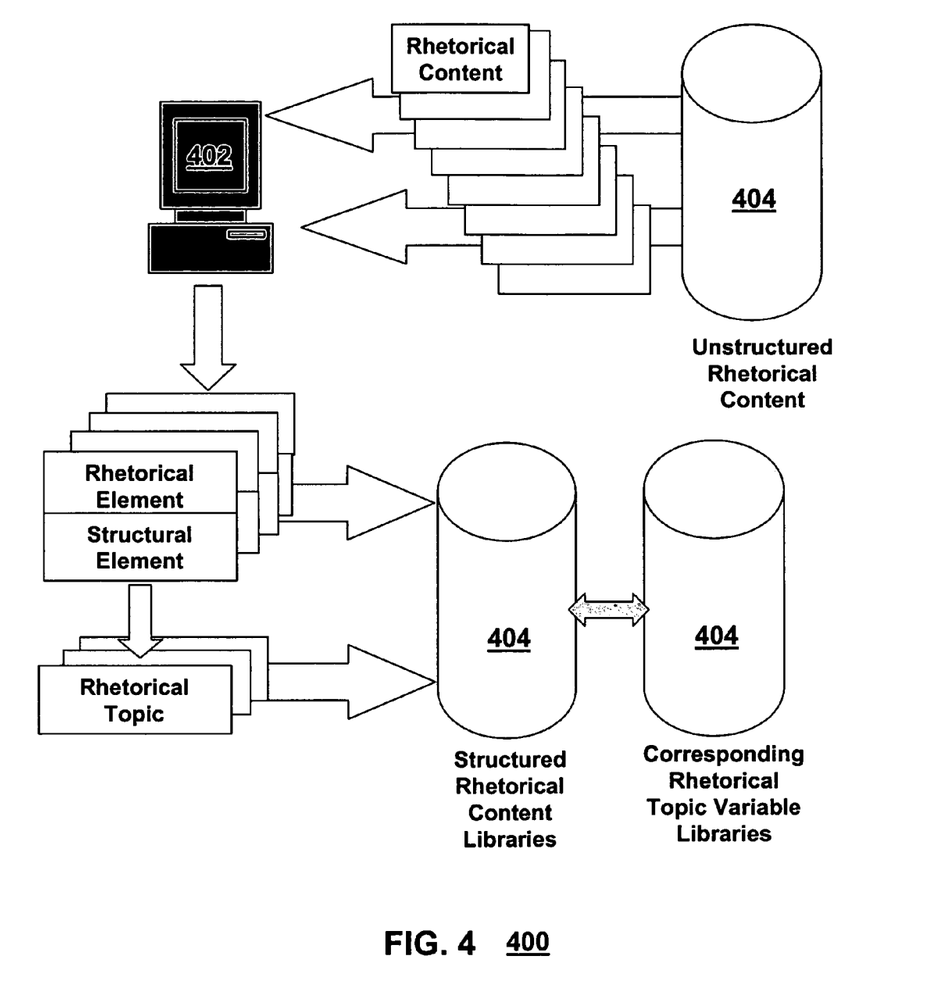
FIG. 4 depicts an exemplary embodiment of a content management system (CMS) for analyzing, deconstructing, reconstructing, and repurposing rhetorical content.
Figure 5:
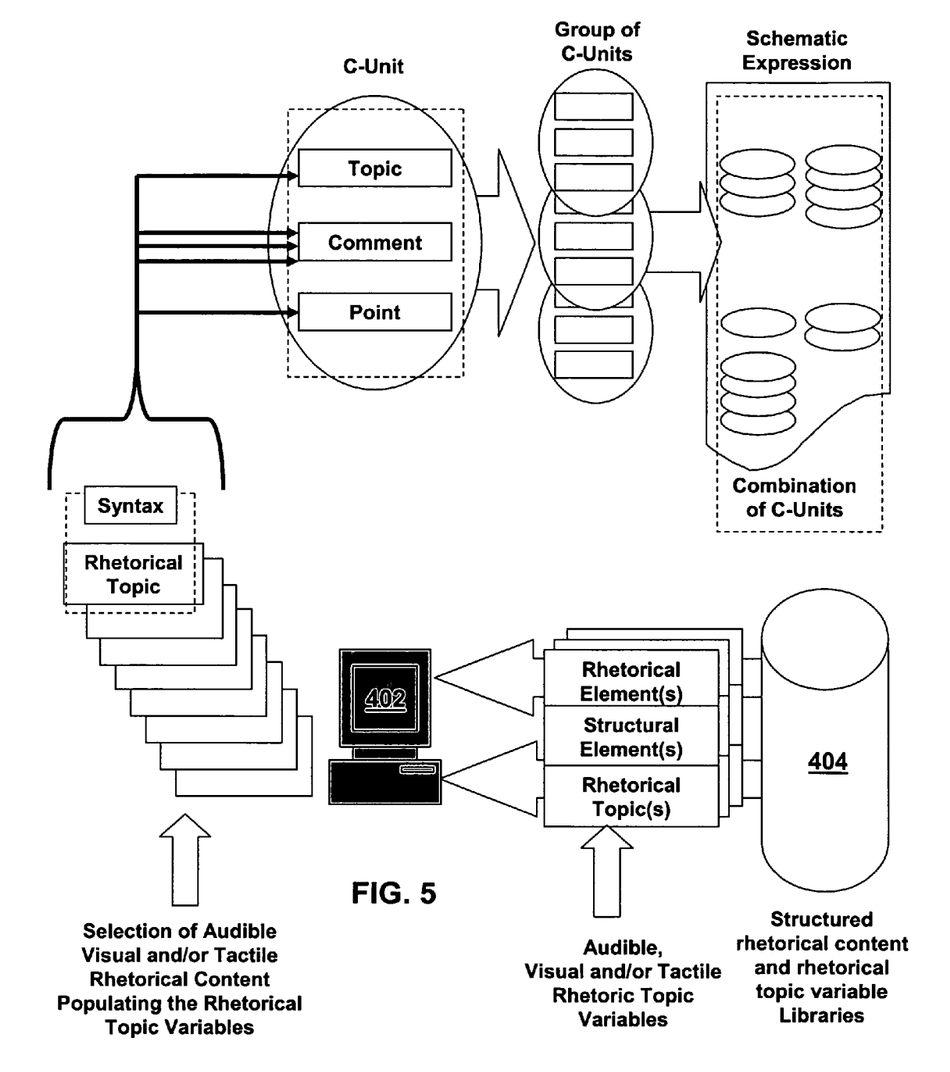
FIG. 5 depicts an exemplary embodiment of the CMS for repurposing the deconstructed rhetorical content.
Figure 6:
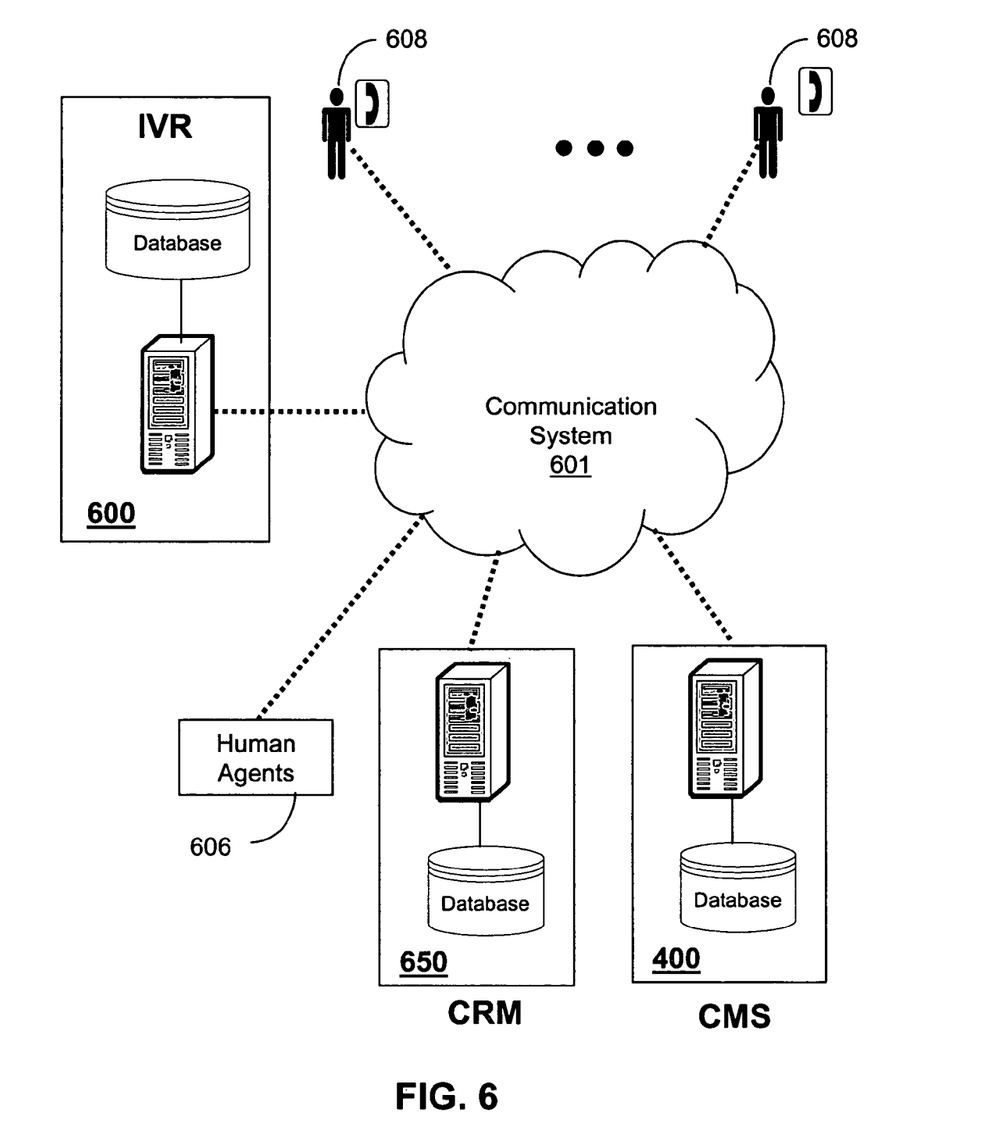
FIG. 6 depicts an exemplary embodiment of the CMS operating in a communication system.

FIGS. 4-5 depict exemplary embodiments of a content management system (CMS) 400 for analyzing, deconstructing, reconstructing, and repurposing rhetorical content. The CMS 400 comprises a controller 402 and a database 404 several instances of which are shown in FIG. 4. The controller 402 can comprise a computing device such as a server for managing operations of the database 404 as disclosed herein. The database 404 can comprise mass storage media such as one or more high capacity disk drives for storing any of the rhetorical content types (e.g., audible, visual or tactile rhetoric) described above. FIG. 6 depicts an exemplary embodiment of the CMS 400 operating in a communication system 603.

Figure 7:
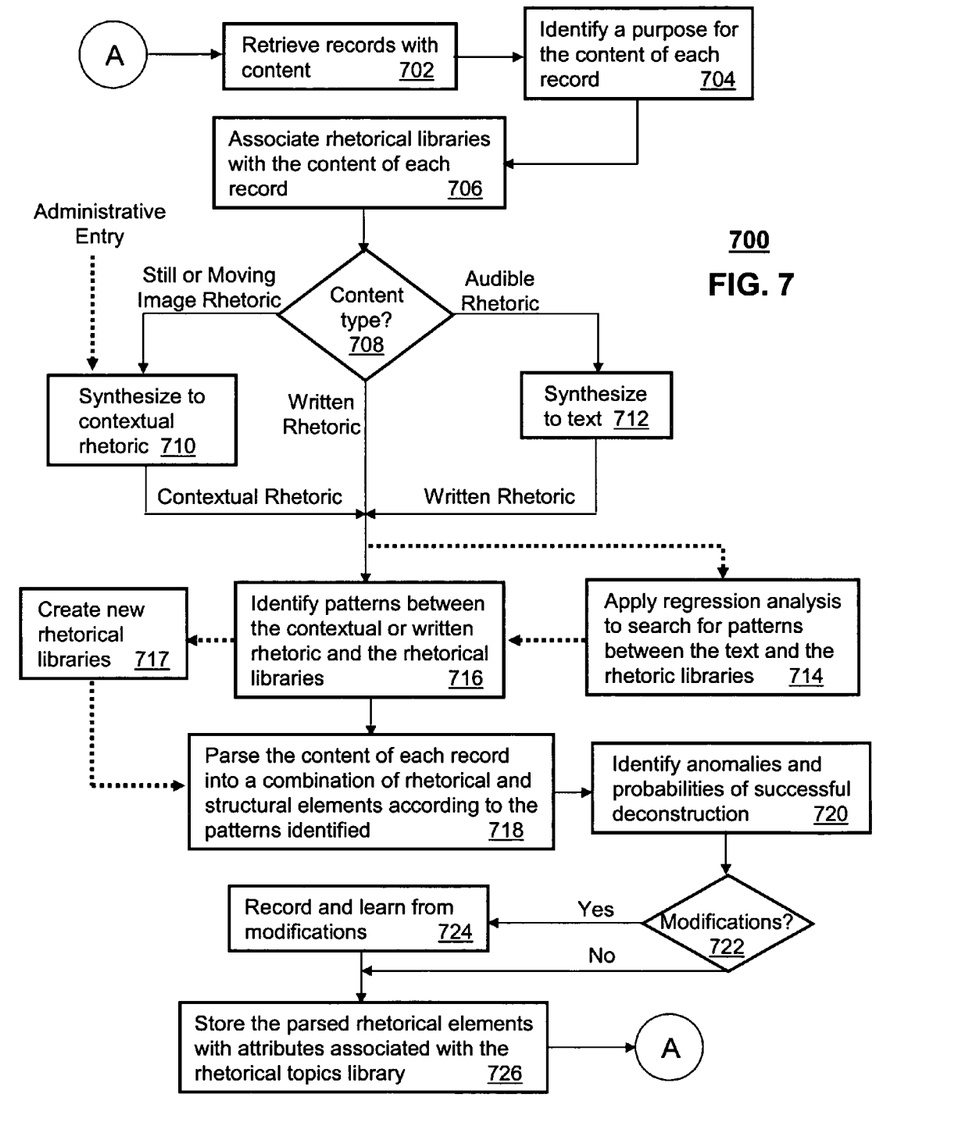
FIG. 7 depicts an exemplary method operating in the CMS for analyzing, deconstructing, and reconstructing rhetorical content.
Figure 8:
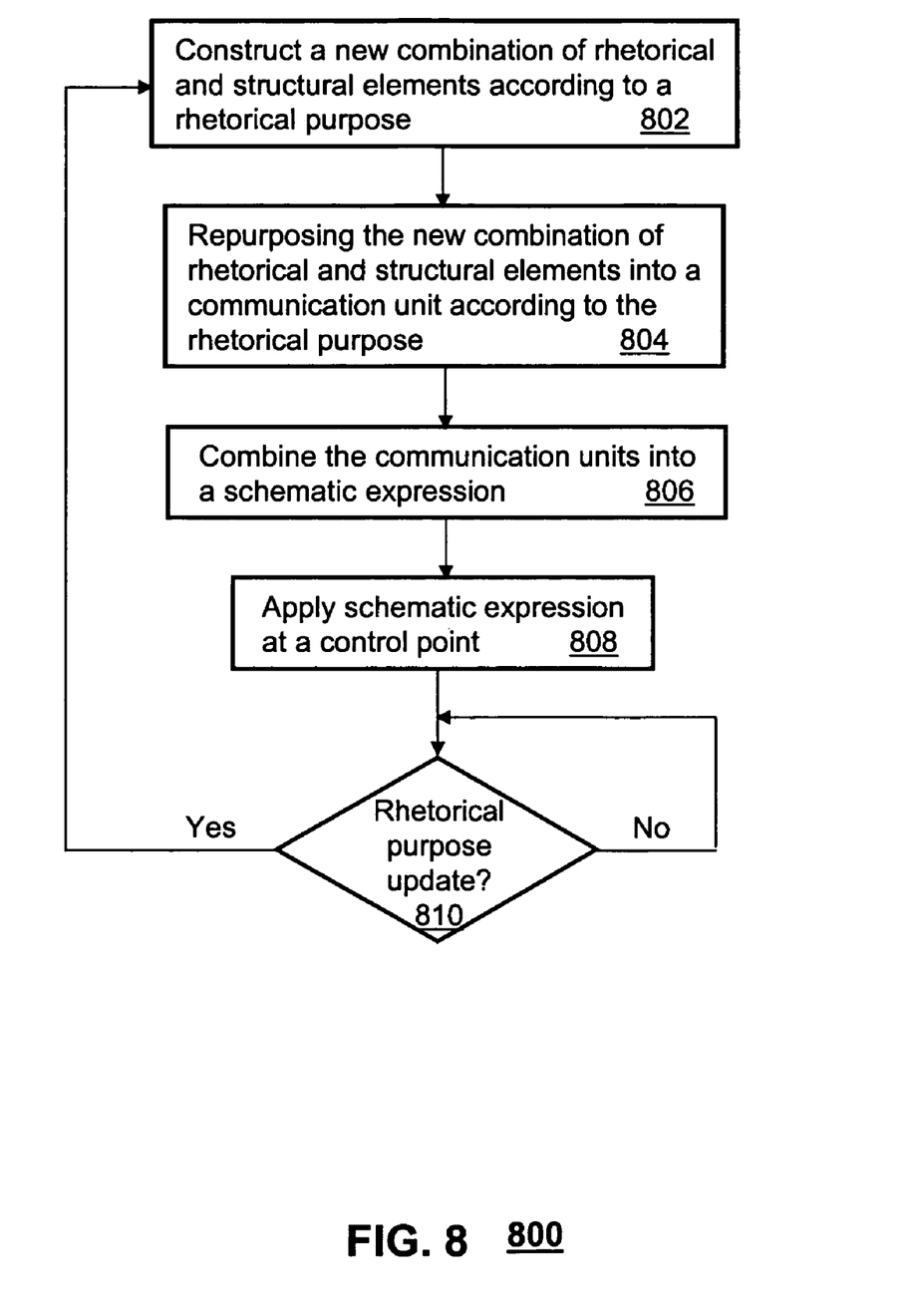
FIG. 8 depicts an exemplary method operating in the CMS for repurposing reconstructed rhetorical content.

To facilitate an understanding of the embodiments of FIGS. 4-6, the reader's attention is directed to FIGS. 7-8 which depict exemplary methods 700-800 operating in the CMS 400. FIG. 7 depicts an exemplary method 700 for analyzing, deconstructing, and reconstructing rhetorical content. FIG. 8 depicts an exemplary method 800 for repurposing reconstructed rhetorical content. Method 700 can be utilized for analyzing, deconstructing, and reconstructing any of the rhetorical content types discussed earlier into structured rhetorical content associated with rhetorical topic libraries. Method 700 can be especially useful for reengineering legacy rhetorical content. Once the reconstruction process is completed, method 800 can be applied for dynamically repurposing the reconstructed content.

Method 700 begins with step 702 in which the controller 402 of the CMS 400 retrieves records from its database 404. This step represents the retrieval of unstructured rhetorical content that needs to be analyzed, deconstructed, and reconstructed into structured rhetorical content associated with the rhetorical topic library as shown diagrammatically in FIG. 4. Each record of rhetorical content retrieved in step 702 is "unstructured" in the sense that no one has defined the functions that each portion (e.g., sentences) of the retrieved rhetorical content is desired to fulfill. In step 704, the controller 402 is programmed to identify a purpose for the rhetorical content retrieved for each record. The controller 402 can be programmed with conventional software to recognize contextual information from the unstructured rhetorical content of each record, or the contextual information can be provided by personnel of the CMS 100. The contextual purpose identified can be of any kind. For instance, the rhetorical content can consist of marketing materials, advertisement, legal agreements, research documents, product descriptions, technical support methods, call processing trees for an IVR, and so on. Thus, rhetorical content can have any identifiable purpose. In one embodiment, the method can include receiving a user input entered in a plurality of grammatical structured text entry elements associated with a content subject; storing the plurality of grammatical structured text entry elements in a data record associated with the content subject; converting at least a portion of the data record into a structured format file supporting rhetorical elements; and rendering an electronically displayable document using the structured format file. Each of the plurality of grammatical structured text entry elements can have a rhetorical structure to facilitate selective assembly into at least one sentence. The structured format file can include at least one grammatical structured text entry element of the plurality of grammatical structured text entry elements. The electronically displayable document can include the at least one grammatical structured text entry element integrated into at least one sentence. In another embodiment, a content management input tool can be utilized that includes an entry page associated with a content subject. The entry page can include a text entry form element for receiving input text having a specified length. The input text can be constrained in accordance with a grammatical syntax format associated with a rhetorical rule and structure, and a selection element can be configured to initiate manipulation of a data record associated with the content subject upon activation of the selection element. The data record can be stored in a database. In another embodiment, a content delivery application can be utilized that includes a gateway program configured to receive requests associated with a content subject where the requests are received via a distributed network. A rhetorical data file can be utilized that includes a tag-separated data structure. The tag-separated data structure can identify a set of grammatical phrase structures. A parser can be utilized that is responsive to the rhetorical data file. The parser can be configured to selectively construct content relating to the content subject using at least one grammatical phrase structure of the set of grammatical phrase structures. The parser can be configured to provide the content to the gateway program. In yet a further embodiment, a rhetorical content model can be utilized that includes a first computer retrievable grammatical syntax element associated with a rhetorical structure and a second computer retrievable grammatical syntax element associated with the rhetorical structure. The rhetorical structure can facilitate selective assembly of the first computer retrievable grammatical syntax element and the second computer retrievable grammatical syntax element into a sentence.

In step 706, the controller 402 can be programmed to associate rhetorical topic libraries existing in its database 404 with the rhetorical content of each record according to the rhetorical content's purpose. The rhetorical topic libraries represent pre-existing rhetorical topic variable structures stored in the database 404 (such as shown in FIG. 1). The greater the number of rhetorical topic library structures, the more likely the controller 402 can identify one or more patterns in the unstructured rhetorical content retrieved in step 702. In one embodiment, at least one pattern in the content of each record can be identified using at least one keyword corresponding to the at least one rhetorical topic library associated with the content.

In step 708, the controller 402 can be further programmed to segregate the rhetorical content by content type. For still or moving image rhetoric, the controller 402 proceeds to step 710. For written rhetoric, the controller 402 proceeds to step 716, while for audible rhetoric the controller 402 proceeds to step 712. In step 710, the controller 402 can be programmed to synthesize still or moving image rhetoric into contextual rhetoric by way of conventional image recognition techniques. Contextual rhetoric can represent textual descriptions of a theme or motif corresponding to the still or moving rhetoric. Alternatively, the contextual rhetoric can be supplied by an administrator who has analyzed the visual rhetoric. In yet another embodiment, textual descriptions can accompany the still or moving images to facilitate deconstruction, reconstruction, and repurposing of said images. In step 712, the controller 402 can be programmed to synthesize audible rhetoric into written rhetoric using common speech to text synthesizes software.

Once the audible or visual rhetoric has been processed, the controller 402 proceeds to step 716 where it identifies patterns between the contextual or written rhetoric and the rhetorical topic libraries selected in step 706 on a per record basis. Pattern recognition can be performed by common statistical techniques such as regression analysis. The controller 402 can, for example, process the rhetorical content in step 714 by regression which can involve fitting a model to the rhetorical content with both deterministic (predictor) and stochastic (error term) components.

If the comparison between the content and the rhetorical libraries results in a match or nearly a match, the controller 402 can proceed to step 718 where it parses and stores the rhetorical content into a combination of audible and visual rhetorical elements according to the patterns identified in steps 714-716. The stored parsed content can have functional attributes (e.g., pointers) that associate said content to one or more corresponding matching variables in the rhetorical topic libraries as identified by the foregoing patterns. If, on the other hand, the comparison between the rhetorical libraries and the content is substantially dissimilar, the controller 402 can be programmed to proceed to step 717 where it can create one or more new variable rhetorical element entries in the rhetorical library. From step 717, the controller 402 proceeds to step 718 to parse and store the rhetorical elements according to these new library entries. The rhetorical elements similarly include functional attributes of association with the new library entries. In one embodiment, at least one rhetorical topic library corresponds to at least one rhetorical function.

In step 720 the controller 402 can be further programmed to identify anomalies and/or probabilities of successful deconstruction on a per record basis. An anomaly can be identified by common pattern recognition and comparison techniques. For example, an anomaly can be detected according to poor correlation, poor variance, or a wide standard deviation generated in step 714 for one or more records. Similarly, the regression technique of step 714 can generate a probability (or confidence) of success or error in the patterns detected for each record.

In step 722, the controller 402 can be programmed to accept modifications from personnel (or draftspersons) managing the CMS 100. Personnel can make modifications to parsed rhetorical elements having an anomalous or low probability tag generated in step 720. Personnel can also analyze and make modifications to any other portion of the parsed rhetorical elements according to errors missed by the CMS 100. If such modifications are made, the controller 402 records the modifications and can be programmed to learn from the modifications using the same or similar statistical techniques referred to in steps 714-716. If no modifications are made, the controller 402 proceeds to step 726 where it stores the parsed combination of audible and visual rhetorical elements in the database 404. Based on the lessons learned from deconstructing the rhetorical content retrieved in step 702, and the modifications made in step 722, the controller 402 can be programmed to improve steps 702-726 for future iterations.

Once audible and visual rhetoric has been reconstructed into structured rhetorical content by the steps of method 700, it can be repurposed according to method 800 as described in FIG. 8. Method 800 can begin with step 802 where the controller 402 constructs according to a rhetorical purpose a new combination of one or more rhetorical and structural elements from the second plurality of records associated with the rhetorical topic library by the functional attributes. The rhetorical purpose can be supplied by an administrator who is requesting the product. For example, the rhetorical purpose might be a software licensing agreement. Based on an expansive library of rhetorical topics relating to this rhetorical purpose the controller 402 can be directed in step 804 to repurpose the combination of rhetorical topics into a number of C-Units. For example, one C-Unit can represent the agreement preamble, another can represent a definition section, another can represent grant clauses, another can represent confidentiality clauses, and so on. In step 806, the controller 402 can combine the C-Units into a schematic expression which in this illustration represents the license agreement in question. FIG. 5 illustrates the aforementioned repurposing process diagrammatically.

In a supplemental embodiment, the controller 402 can be programmed to dynamically apply in step 808 the schematic expression at a control point such as, for example, the IVR 600 shown in FIG. 6. The schematic expression in this embodiment can be a call processing tree represented by a number of C-Units including written rhetorical topics (to be later synthesized into speech by the IVR 600) or pre-synthesized into audible rhetorical topics each of which are invoked by a caller 608 as s/he navigates through the menu of the IVR 600.

In step 810, the controller 402 can be further programmed to detect a need to repurpose one or more C-Units of the call tree. The detection mechanism of step 810 can be driven in part by feedback from the IVR 600 such as a statistical use of the call processing tree. Such statistics can identify, for example, excessive call tree navigations by callers 608 (indicating perhaps confusion and lack of efficiency in the call tree), excessive call terminations by the callers 608 without accomplishing a desirable task (e.g., purchasing a product), and/or direct caller feedback by way of surveys.

With such information, the CMS 100 can dynamically repurpose the call processing tree with iterative changes to the C-Units and/or the rhetorical and structural elements constructed in step 802 to achieve better navigation efficiencies and customer satisfaction. Alternatively, or in combination, the call tree can be dynamically repurposed by the CMS 100 according to business rules such as sell through, and demographics and/or psychographics determined from a CRM (Customer Relationship Management) system 650 for each caller. These rules can be used to repurpose C-Units which can include offers with individualized promotions, rebates, or coupons.

The IVR 600 can also serve as a technical support center in which the CMS 100 can dynamically repurpose a technical support call processing tree according to the caller's level of expertise and needs. Similarly, dynamically repurposed C-Units can be utilized by human agents 606 operating at sales, billing, technical support, or trouble shooting call centers. The CMS 100 in these instances can dynamically repurpose reconstructed rhetorical content on the basis of the agents needs or observed behavior of the agents' access to informational databases.

The reconstructed rhetorical content can also be used in websites operating in the communication system 601 which can support a hybrid of wireline (e.g., Plain Old Telephone Service or POTS), and wireless services (e.g., cellular, WiFi, WiMax, Software Defined Radio-SDR, and so on). The websites can be dynamically repurposed by the CMS 400 for frequently asked questions (FAQs), advertisements, product descriptions, pricing, and so forth. If the caller 608 is a known customer, the CMS 100 can also be programmed to repurpose reconstructed rhetorical content on the basis of known information of the customer (e.g., currently used services, complementary services that can be offered, pricing discounts for customers with a high credit rating, etc.). In one embodiment, an input tool can be used to gather content segments and store those segments in a database. The content segments may, for example, be sentence fragments, phrases, nouns, sentences, and paragraphs. In one exemplary embodiment, sentence fragments are entered, following a specific grammatical format that fulfills a specified rhetorical purpose. Using the rhetorical format, parts of a sentence may be gathered, stored and associated as fields in the content database. Rhetorical principles control the development of the syntax from the grammatical elements and drive the deployment of the content to the application based on the communication function that the write wants to achieve. The applications may construct content using the various formats or models. Some of the fields in the record may, for example, follow a rhetorical model. In this example, the model utilizes sentence elements having a specific grammatical form designed to meet a particular rhetorical or communication function. The sentence elements or grammatical syntax rules may be used to construct a sentence. In one exemplary embodiment, the rhetorical model may be used to form a sentence having three elements, a product name, product class, and product description as shown below. The rhetorical/communication function this grammatical construct is designed to achieve is DEFINE: <<Product name>> is a <<product class>> that <<product description>>. To produce a grammatically correct sentence, the elements follow specific grammatical forms. For example, the product name is a noun, the product class may be a noun that agrees with the singular verb "is" and singular article "a", and the product description may be a phrase beginning with a third-person singular active verb. An example is <<A chair>> is a <<piece of furniture>> that <<has four legs, a platform for sitting, and a back to lean against>>. In one embodiment, the input tool can be utilized to receive content segments or rhetorical units and store those segments in a database. The content segments are not necessarily limited in form or substance and may, for example, be words, sentence fragments, phrases, nouns, partial sentences, complete sentences, graphics, legal disclaimers, and/or complete paragraphs. In one exemplary embodiment, sentence fragments having rhetorical content may be entered. These sentence fragments may have a specific grammatical format and fulfill a specified rhetorical purpose.

It should be noted that the present disclosure differs from prior art systems that create content on a ready-made basis. The present disclosure teaches a means for deconstructing, constructing and repurposing content on demand. Consequently, the present disclosure is much more flexible and adaptable to commercial needs as they may arise. It should also be evident from the foregoing descriptions that there is simply no limit to the applications for analyzing, deconstructing, reconstructing, and repurposing rhetorical content as described by the claims set out below. For example, a proposal builder or e-brochure builder can be provided, where a content server may provide the content elements as a data record set. Applications can interpret the data record set, selectively utilizing the content elements to develop context-specific content. The content may then be provided in a document, flash file, PDF, or other electronic format. In one embodiment, a website may be delivered to users. The pages may include content automatically created using the content elements stored in the database. An application server can receive requests associated with a content subject from browsers. The application server may have a gateway program that acts to receive the requests and provide the output. In exemplary embodiments, the gateway server can receive HTTP requests and provide each HTML web page content. For instance, upon receiving a request from the gateway program, the application server may acquire an extensible markup language (XML) file associated with the requested content subject. The XML may have tags that identify the elements. The XML file may be interpreted by an XML parser. The XML file may be associated with a document type definition (DTD) file and further interpreted in accordance with the document type definition (DTD) file. The application server may also include an XSL file as interpreted by an XSL processor. Together, the XML parser and the XSL processor provide content elements to the gateway program. The gateway program assembles the content elements into content included in the web pages. Each web page may utilize different elements derived from the grammatical syntax fields stored in the database and transferred utilizing the XML file. In this manner, the content elements may be utilized in accordance with the intended purpose of the content.

Figure 9:
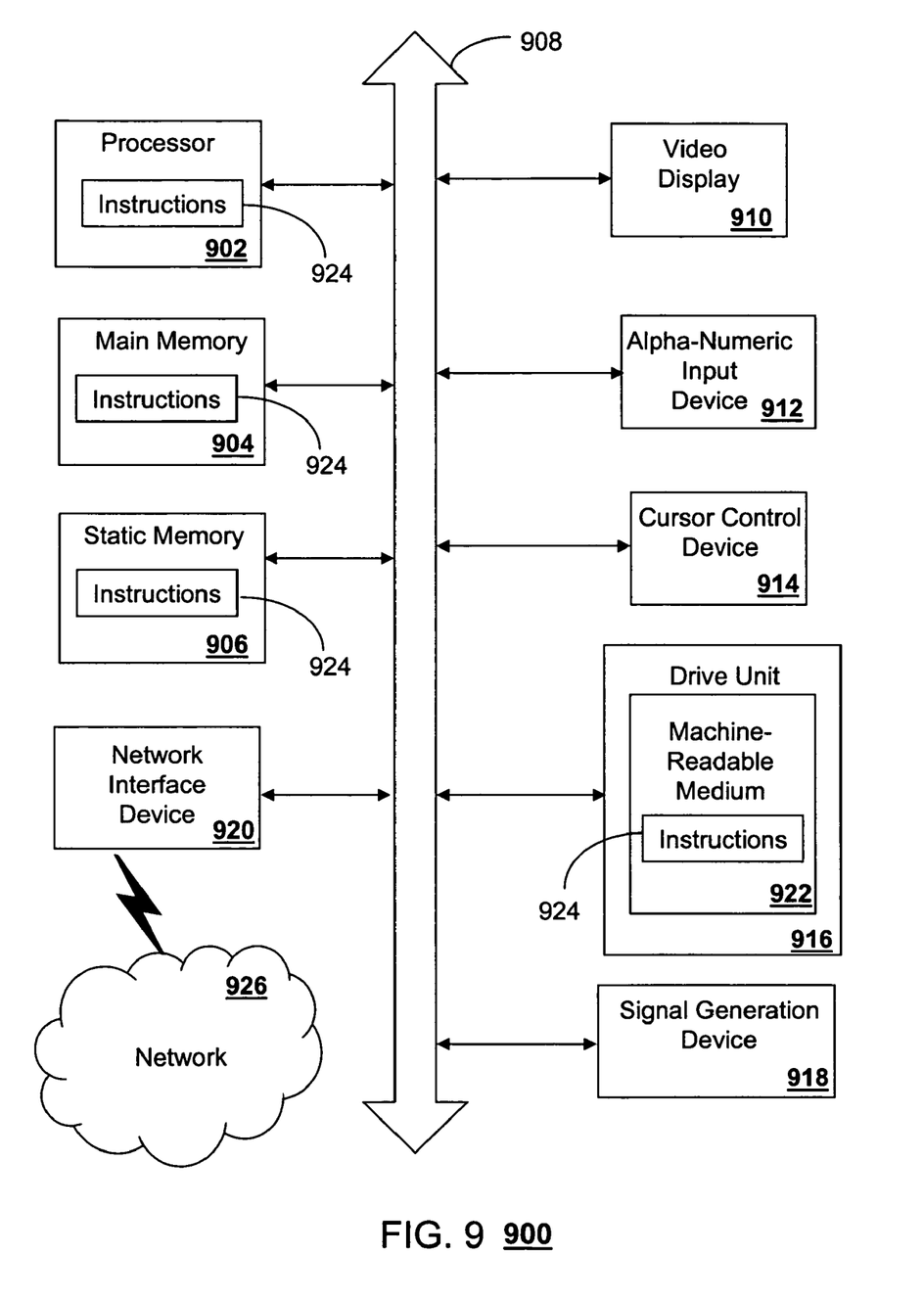
FIG. 9 depicts an exemplary diagrammatic representation of a machine in the form of a computer system within which a set of instructions, when executed, may cause the machine to perform any one or more of the methodologies disclosed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable storage medium in a content management system, comprising computer instructions for:
    retrieving at least one of a first plurality of records, each comprising content;
    receiving a user input of contextual information;
    storing the contextual information;
    determining a rhetorical purpose for the content of each record by comparing the content with the contextual information;
    associating at least one rhetorical topic library with the content of each record according to the content's determined rhetorical purpose;
    parsing the content of each record into a combination of one or more rhetorical and structural elements by utilizing the at least one rhetorical topic library associated with said content; and
    storing the rhetorical elements each with an identifiable functional attribute for association with a portion of the at least one rhetorical topic library.

2. The storage medium of claim 1, wherein the content comprises at least one among visual rhetoric, audible rhetoric, and tactile rhetoric, and wherein the at least one rhetorical library is a database independent of the first plurality of records.

3. The storage medium of claim 2, wherein visual rhetoric comprises at least one among still image rhetoric, moving image rhetoric, and written rhetoric, wherein the audible rhetoric comprises at least one among synthesized audible rhetoric, and human audible rhetoric, and wherein tactile rhetoric comprises rhetoric in Braille.

4. The storage medium of claim 1, wherein each of the one or more structural elements conform to one or more rules for conveying a coherent expression.

5. The storage medium of claim 4, wherein the one or more rules comprise at least one among rules for written rhetoric, rules for audible rhetoric, and rules for visual rhetoric.

6. The storage medium of claim 1, wherein the at least one rhetorical topic library corresponds to the identifiable functional attribute, and wherein the parsing of the content is performed without use of a previous version of the content.

7. The storage medium of claim 1, comprising computer instructions for identifying at least one pattern in the content of each record with at least one keyword corresponding to the at least one rhetorical topic library associated with said content.

8. The storage medium of claim 1, comprising computer instructions for:
    identifying patterns between the content of each record and the at least one rhetorical topic library associated with said record; and
    parsing the content of each record into a combination of one or more rhetorical and structural elements according to the patterns identified.

9. The storage medium of claim 8, comprising computer instructions for applying regression analysis to search for patterns between the content of each record and the at least one rhetorical topic library associated with said record.

10. The storage medium of claim 1, comprising computer instructions for synthesizing content having audible rhetoric for comparison with the at least one rhetorical topic library associated with said content.

11. The storage medium of claim 10, comprising computer instructions for:

synthesizing the audible rhetoric in each record into written rhetoric;
identifying patterns between the written rhetoric generated for each record and the at least one rhetorical topic library associated with said record; and
parsing the audible rhetoric into a combination of one or more audible rhetorical and structural elements according to the patterns identified.

12. The storage medium of claim 1, comprising computer instructions for synthesizing content having visual rhetoric for comparison with the at least one rhetorical topic library associated with said content.

13. The storage medium of claim 12, comprising computer instructions for:
synthesizing the visual rhetoric in each record into contextual rhetoric;
identifying patterns between the contextual rhetoric generated for each record and the at least one rhetorical topic library associated with said record; and
parsing the visual rhetoric into a combination of one or more visual rhetorical and structural elements according to the patterns identified.

14. The storage medium of claim 1, comprising computer instructions for storing into a second plurality of records the rhetorical elements and their corresponding functional attributes.

15. The storage medium of claim 14, comprising computer instructions for:
constructing according to a rhetorical purpose a new combination of one or more rhetorical and structural elements from the second plurality of records associated with the rhetorical topic library by the functional attributes; and
repurposing the new combination of one or more rhetorical and structural elements into at least one communication unit according to the rhetorical purpose.

16. The storage medium of claim 15, comprising computer instructions for processing the at least one communication unit in an interactive voice response system (IVR).

17. The storage medium of claim 15, wherein the at least one communication unit comprises a topic statement, one or more comment statements, and a point statement constructed from one or more rhetorical topics.

18. The storage medium of claim 14, comprising computer instructions for:
constructing according to a rhetorical purpose a new combination of one or more rhetorical and structural elements from the second plurality of records associated with the rhetorical topic library by the functional attributes;
repurposing the new combination of one or more rhetorical and structural elements into a plurality of communication units; and
combining the plurality of communication units into a schematic expression.

19. The storage medium of claim 15, comprising computer instructions for constructing from the at least one communication unit at least one among a proposal, an electronic brochure, a product description, and an advertisement in accordance with the rhetorical purpose.

20. A content management system, comprising:
a database comprising contextual information; and
a controller for managing the database, programmed to:
retrieve at least one of a first plurality of records, each comprising content;
determine a rhetorical purpose for the content of each record by comparing the content with the contextual information;
retrieve rhetorical libraries based at least in part on the determined rhetorical purpose for the content of each record;
identify patterns between the rhetorical libraries and the content of each record;
parse the at least one pattern of each record into the one or more rhetorical topics; and
deconstruct the content into one or more rhetorical topics according to the patterns identified.

21. The content management system of claim 20, wherein the controller is programmed to:
receive a user input of the contextual information;
identify at least one pattern in the content of each record with at least one keyword associated with each of the rhetorical libraries, wherein the rhetorical libraries comprise pre-existing rhetorical variable structures;
parse the one or more rhetorical topics of each record into a corresponding one or more rhetorical and structural elements, wherein the parsing of the at least one pattern or the one or more rhetorical topics is performed without use of a previous version of the content; and
store the one or more rhetorical elements of each record into a second plurality of records corresponding to reconstructed rhetorical content having functional attributes associated with the rhetorical libraries.

22. The content management system of claim 21, wherein the controller is programmed to:
construct a combination of one or more rhetorical topics from the second plurality of records and the rhetorical libraries associated therewith according to the functional attributes;
repurpose the combination of one or more rhetorical topics into a plurality of communication units; and
combine the plurality of communication units into a schematic expression having at least one among audio, visual, and tactile rhetoric, and wherein the identifying of the purpose for the content of each record is based at least in part on a user input of contextual information.

23. A method in a content management system for deconstructing multimedia content, comprising:
retrieving from a first plurality of records one or more records each comprising multimedia content;
obtaining contextual information;
determining a rhetorical purpose for the multimedia content of each record by comparing the content with the contextual information;
identifying rhetorical and structural libraries associated with each determined rhetorical purpose;
identifying similarities between the rhetorical and structural libraries and the multimedia content in each record;
parsing the multimedia content of each record into one or more rhetorical and structural elements according to the similarities identified; and
storing the one or more rhetorical elements of each record in a second plurality of records with functional attributes for association to the rhetorical and structural libraries.

24. The method of claim 23, comprising identifying a probability of success in deconstructing the multimedia content of each record into corresponding one or more rhetorical and structural elements; and parsing the multimedia content without use of a previous version of the multimedia content.

25. The method of claim 23, comprising:
detecting dissimilarities between the rhetorical and structural libraries and the multimedia content; and creating one or more new rhetorical and structural libraries that match the multimedia content.

26. The method of claim 23, comprising identifying anomalies in deconstructing the multimedia content of each record into corresponding one or more rhetorical and structural elements, wherein the identifying of the purpose for the multimedia content is based at least in part on a user input of contextual information.

27. The method of claim 23, comprising:
receiving from a draftsperson modifications to a portion of the one or more rhetorical elements stored in the second plurality of records;
learning from the modifications made by the draftsperson; and
adjusting one or more of the steps of retrieving, identifying the purpose, identifying the rhetorical and structural libraries, identifying the similarities, parsing the multimedia content, and storing of the one or more rhetorical elements based on the learning from the modifications.

28. The method of claim 23, comprising:
constructing a combination of one or more rhetorical and structural elements from the second plurality of records and the rhetorical and structural libraries according to the functional attributes associated therewith; and
repurposing the combination of one or more rhetorical topics into at schematic expression.

* * * * *